United States Patent [19]

Bergman

[11] 3,902,321

[45] Sept. 2, 1975

[54] SPEED CONTROL VALVES FOR STIRLING TYPE HOT GAS ENGINES

[75] Inventor: Ulf Christer Bergman, Malmo, Sweden

[73] Assignee: Kommanditbolaget United Stirling (Sweden) AB & Co., Malmo, Sweden

[22] Filed: Nov. 1, 1973

[21] Appl. No.: 412,036

[30] Foreign Application Priority Data
Nov. 2, 1972 United Kingdom............... 50520/72

[52] U.S. Cl. .................... 60/521; 251/62; 251/63.4
[51] Int. Cl. ............................................. F02g 1/06
[58] Field of Search..................... 60/517, 521, 522

[56] References Cited
UNITED STATES PATENTS

| 3,036,427 | 5/1962 | Meijer | 60/521 |
| 3,756,018 | 9/1973 | Hakansson | 60/522 |

*Primary Examiner*—Martin P. Schwadron
*Assistant Examiner*—Allen M. Ostrager
*Attorney, Agent, or Firm*—Laurence R. Brown

[57] ABSTRACT

In a Stirling cycle engine a gas operated valve member couples a working chamber and a dead volume chamber to control the gas flow therebetween in response to the maximum and minimum pressures of gas in the working cycle. The valve member and actuating members therefor are movable responsive to gas pressure and the actuating members are limited in movement.

4 Claims, 6 Drawing Figures

SPEED CONTROL VALVES FOR STIRLING TYPE HOT GAS ENGINES

This invention relates to a valve-governed connection between a working chamber and a dead volume chamber for working gas in a hot gas engine.

The restriction of the gas flow between the working chamber and the dead volume chamber should often be governed in such a way that certain degrees of restriction are avoided. This desired manner of governing may be obtained by a valve having a limited number of active positions.

The present invention is intended to provide a valve-governed connection as referred to above which may be operated in a reliable manner and which may be designed with very small outer dimensions.

According to the invention there is provided a valve-governed connection between a working chamber and a dead volume chamber for working gas in a hot gas engine, characterized in that a valve member adapted to move relative to a valve seat is backed by an actuating member movable in the same direction as said valve member, a stop being arranged for limiting joint movements of said valve member and said actuating member, means being provided for alternatively supplying gas at working cycle minimum or maximum pressure to a space between said actuating member and said valve member as well as to a space behind said actuating member.

Figure 1:
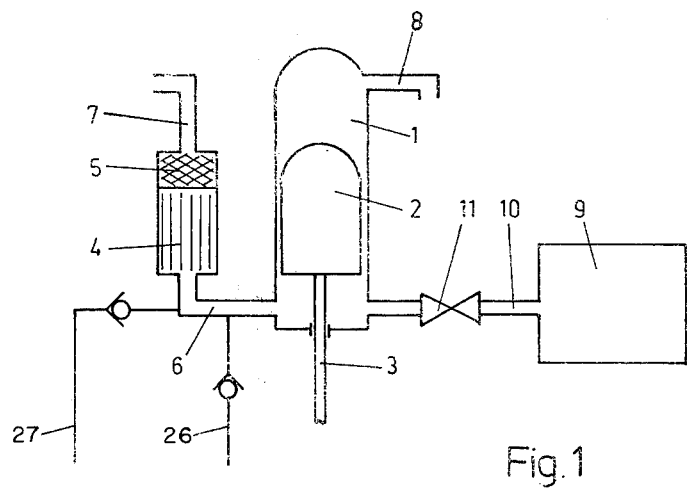
Figure 2:
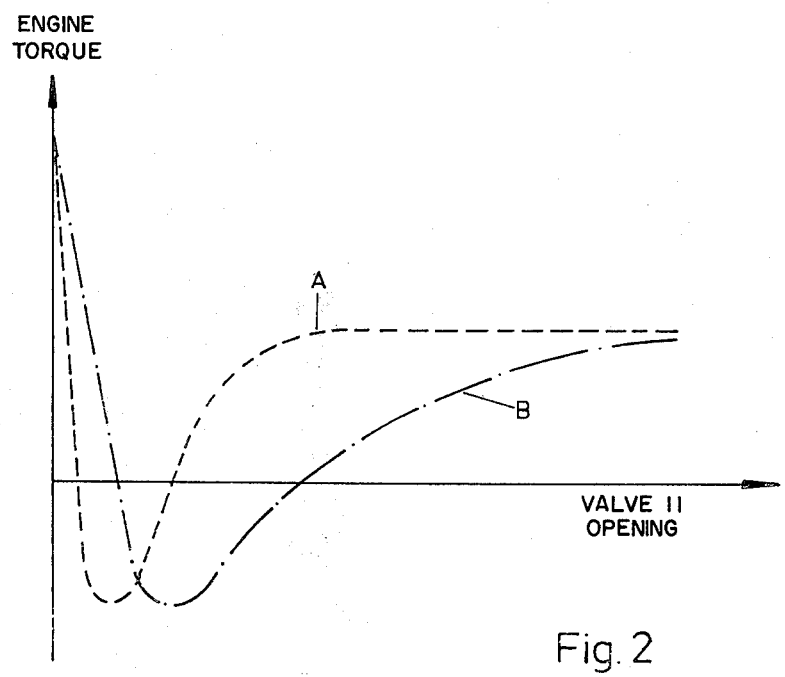

The scope of the monopoly sought is defined in the Claims hereinafter, and how the invention may be put into practice is described in more detail with reference to the accompanying drawings in which:

FIG. 1 shows schematically a part of a hot gas engine having dead volume power control, FIG. 2 shows a graph indicating the engine torque (ordinates) as a function of the valve opening (abscissae) in the conduit to the dead volume chamber, and FIGS. 3 – 6 show a valve for use in said conduit, each of the FIGS. 3 – 6 illustrating a different valve position.

The hot gas engine shown in FIG. 1 comprises a cylinder 1 receiving a piston 2 connected to a piston rod 3 which in turn is connected to a crank-shaft (not shown). The working space in the cylinder 1 below the piston 2 is connected to a cooler 4 and a regenerator 5 through a pipe 6.

The top of the regenerator 5 is connected to a heater (not shown) at the top of another cylinder (not shown) through a pipe 7. The top of the cylinder 1 is connected to the top of another regenerator (not shown) through a pipe 8 acting as a heater.

The working space of the cylinder 1 below the piston 2 is also connected to a dead volume chamber 9 through a channel 10 containing a valve 11. The functioning of the valve 11 is illustrated in FIGS. 3 – 6.

As shown in FIG. 2, the torque of a hot gas engine running at a constant speed will decrease if the working gas spaces are connected to a dead volume chamber. If the connection does not offer any substantial resistance against gas flow the efficiency of the engine is not affected to any greater extent. However, if the connection does offer a resistance the efficiency is lowered to such extent that the power output may be negative, i.e. the engine will function as a brake relative to its load. FIG. 2 shows two curves corresponding respectively to low speed (curve A in dotted line) and high speed (curve B in dash-dotted line).

It will be understood from the graph in FIG. 2 that the minimum torque (maximum braking effect) is obtained at greater valve openings with increasing engine speed.

The valve described below with reference to FIGS. 3 – 6 will be able to establish valve openings corresponding to maximum power output (closed valve), part load at maximum efficiency (valve fully opened), and maximum braking efficiency at two different speeds (partial opening of valve to two different extents).

The valve shown in FIGS. 3 – 6 comprises a valve housing 12 containing a channel 10 corresponding to the channel 10 of FIG. 1. A valve member 13 is located and is axially movable in a bore 14 relative to a valve seat 15. Another bore 16 of larger diameter contains an actuating member 17 movable therein, the movements of the member 17 in the upwards direction towards the valve member 13 being limited by a stop in the shape of a shoulder surface 18 between the two bores 14 and 16. A further actuating member 19 is axially movable in a bore 20 and is located below the actuating member 17. A stop 21 formed by a shoulder surface between the bores 16 and 20 will limit the upward movements of the actuating member 19.

Bores 22, 23 and 24 are provided in the valve housing 12 and lead respectively to the shoulder surfaces 18, 21 and to an end surface 25 forming the end wall limiting downwards movements of the further actuating member 19.

Each of the bores 22, 23 and 24 may be connected either to a pipe 26 containing working gas of maximum cycle pressure or to a pipe 27 containing working gas at working cycle minimum pressure, the connection being established by a distributor valve (not shown) of conventional design. Said pipes 26 and 27 are shown in FIG. 1 and contain non-return-valves and are connected with the pipe 6 leading to the working space in the cylinder 1 located below the piston 2.

Figure 3:
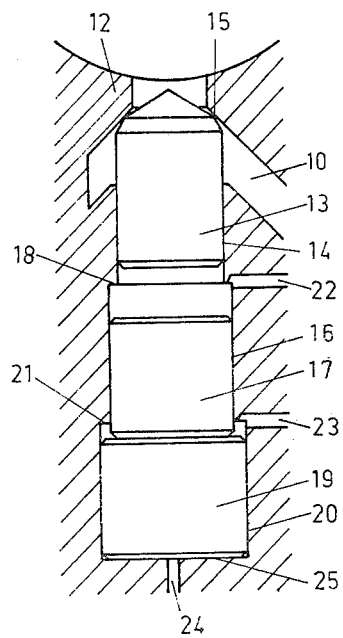

FIG. 3 shows the position in which the valve member 13 engages the valve seat 15 and the gas flow through the channel 10 is fully blocked. This position of the valve member 13 is obtained by supplying gas at working cycle maximum pressure to the bore 22.

If gas at working cycle minimum pressure is supplied to the bore 22 any of the positions shown in FIGS. 4, 5 and 6 may be obtained as described below.

Figure 4:
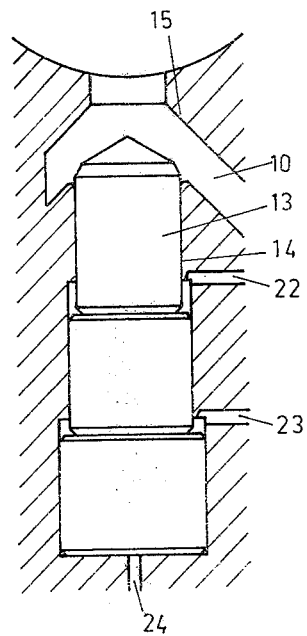

FIG. 4 shows the position in which the valve is fully open. The bores 23 and 24 are connected to the pipe 27 containing gas at cycle minimum pressure. The gas pressure prevailing in the channel 10 will vary between cycle maximum and minimum pressure. The upwardly-direct force on the valve member 13 is a result of the said minimum gas pressure working on an area corresponding to that of the bore 14. Consequently the valve will remain fully open.

Figure 5:
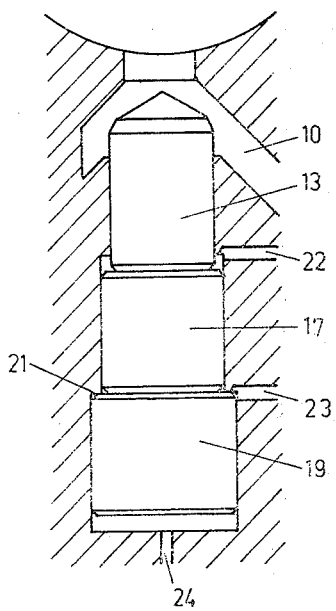

FIG. 5 shows the position of the valve member 13 if gas at the cycle maximum pressure is supplied below the further actuating member 19 while gas at cycle minimum pressure is supplied to the bore 23. The further actuating member 19 will move upwards until it engages the shoulder surface 21. The members 13 and 17 will participate in said movement and the valve member 13 will partly block the channel 10 corresponding e.g. to an opening at which the minimum of curve B in FIG. 2 is obtained.

Figure 6:
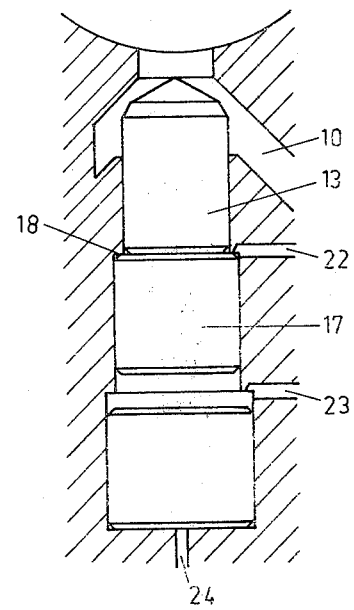

FIG. 6 shows the position of the valve member 13 obtained if gas at cycle maximum pressure is applied to the bore 23 (while gas at cycle minimum pressure is still supplied to the bore 22). The actuating member 17 will now be moved into its upper end position engaging the shoulder surface 18 and the valve member 13 will restrict the channel 10 to a greater extent - e.g. corresponding to the minimum value of the curve A in FIG. 2.

What we claim is:

1. In a Stirling type hot gas engine with a working gas chamber having maximum and minimum cycle working gas pressures and a dead volume chamber connected by a passageway, a valve connected in said passageway, comprising in combination, a valve member movable over a path in response to gas pressure to open and close said passageway, an actuating member responsive to move in opposite directions under gas pressure and positioned to define a space between said valve and actuating member and to move said valve partly over said path within defined limits by contact therewith, and conduits for supplying gas alternatively at said different working cycle pressures to opposite sides of said actuating member.

2. The combination defined in claim 1 including a further gas pressure responsive actuating member having a limited degree of movement to contact the first said actuating member and move it through a portion of its movement range, and conduit means for alternately supplying said working gas at said pressures to move said further actuating member.

3. A combination as defined in claim 1 wherein said valve is moved in response to said gas pressures and said actuator in response to selected said gas pressures at said conduits to positions establishing (1) maximum power output, (2) part load at maximum efficiency, and (3) maximum braking efficiency at two different speeds.

4. A combination as defined in claim 1 wherein said valve is moved in response to said gas pressures and said actuator by selecting gas pressures at said conduits to establish partial opening of said valve to two different extents defining maximum braking efficiency at two different speeds.

* * * * *